Feb. 26, 1935.  J. SACHS  1,992,719
SYSTEM OF CIRCUIT CONTROLLING DEVICES
Filed April 2, 1932   4 Sheets-Sheet 1
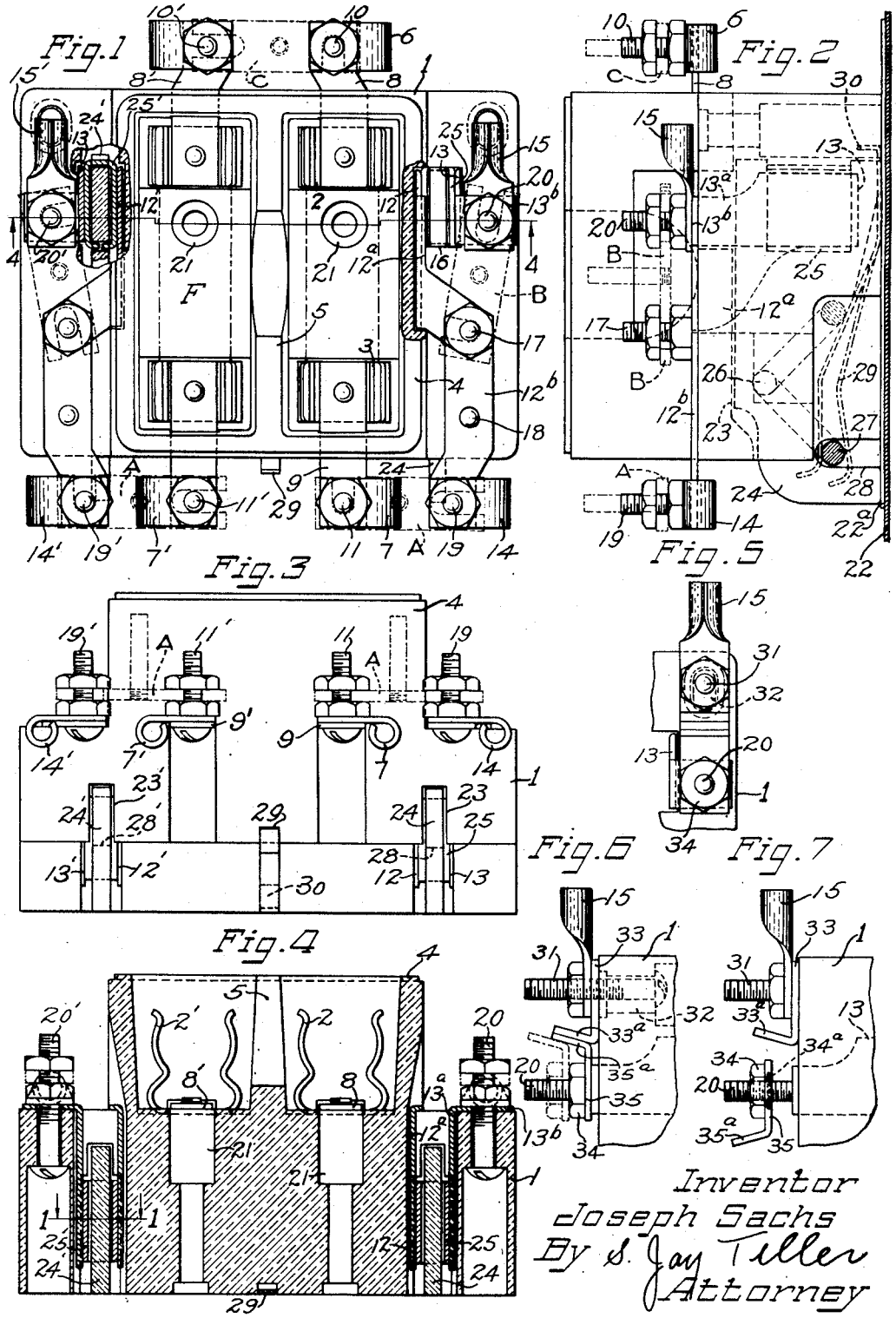
Inventor
Joseph Sachs
By S. Jay Tiller
Attorney Feb. 26, 1935.  J. SACHS  1,992,719
SYSTEM OF CIRCUIT CONTROLLING DEVICES
Filed April 2, 1932   4 Sheets-Sheet 2
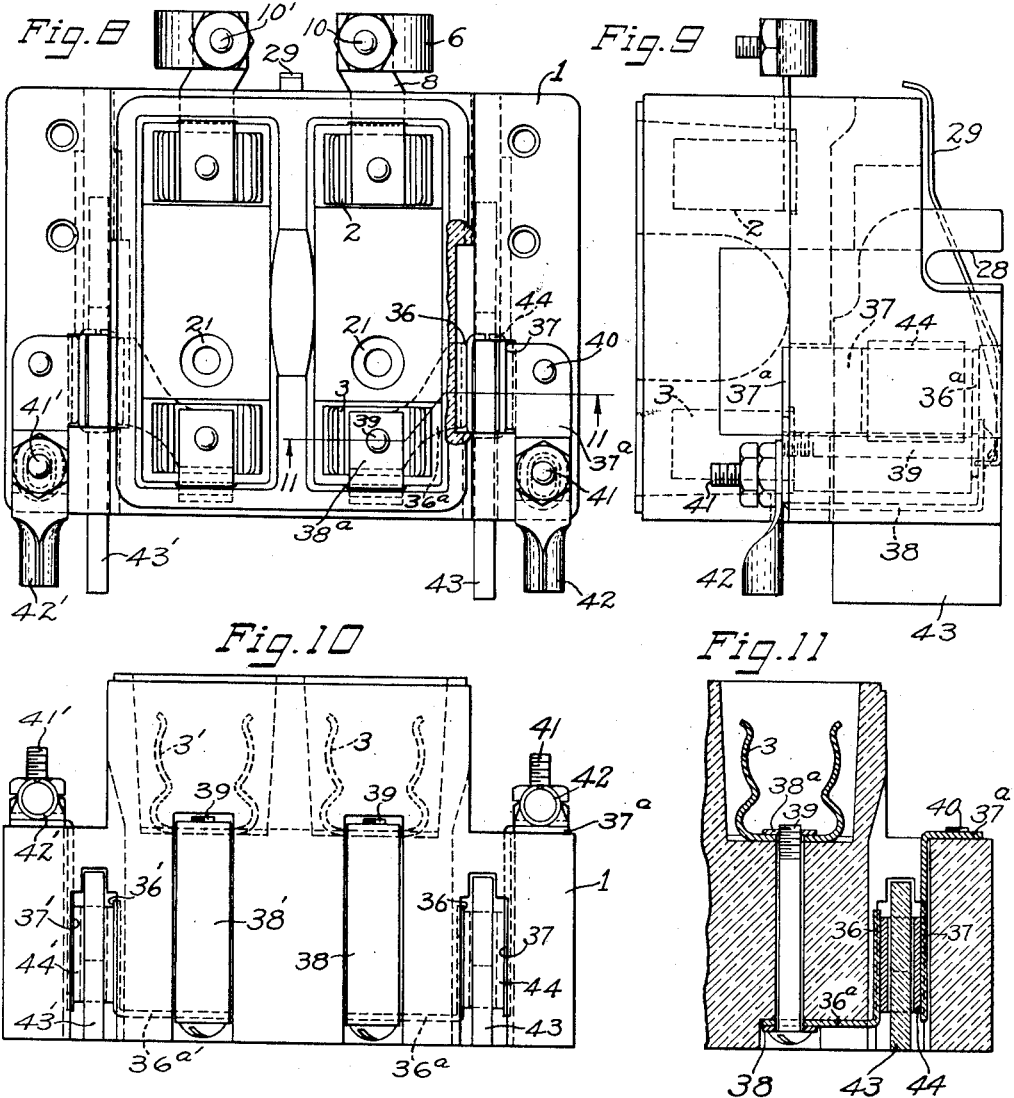
Inventor
Joseph Sachs
By S. Jay Teller
Attorney

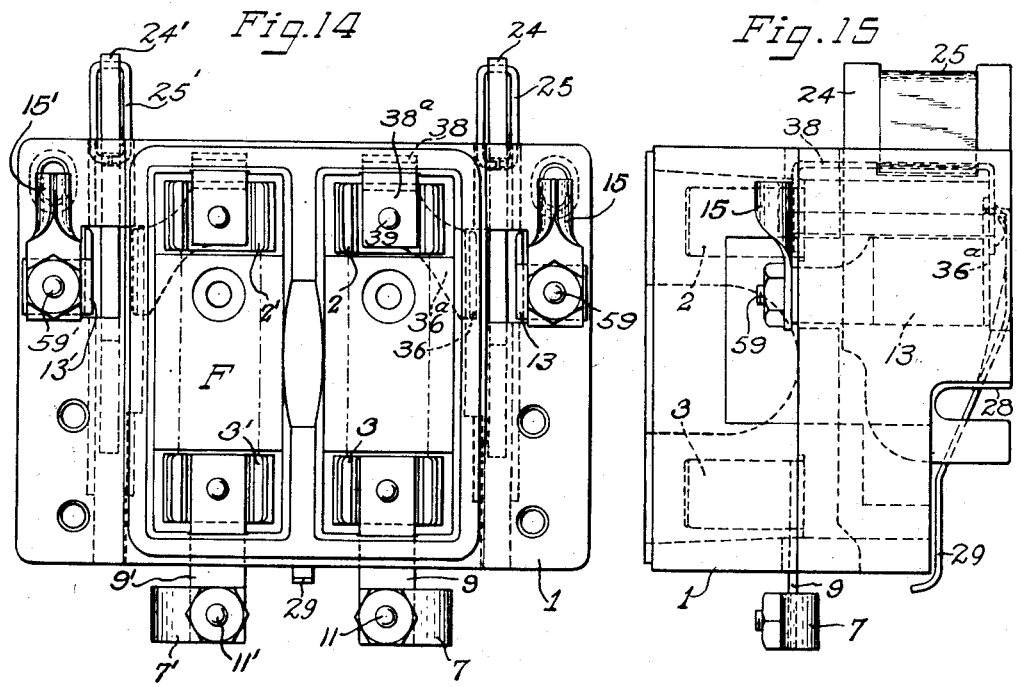
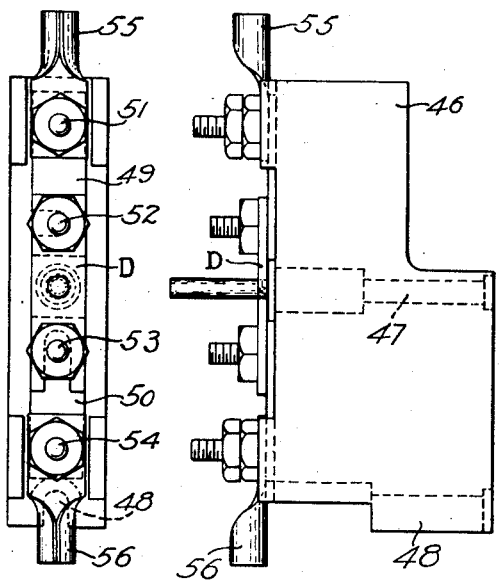
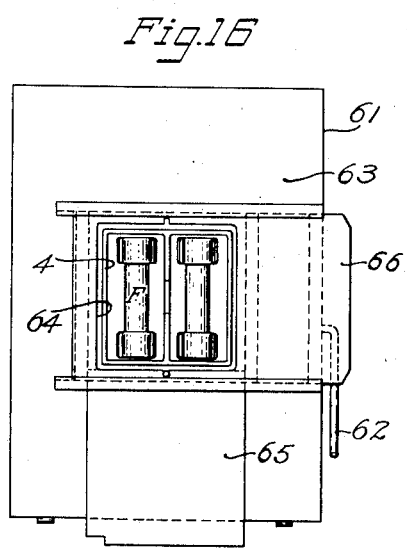

Feb. 26, 1935.  J. SACHS  1,992,719
SYSTEM OF CIRCUIT CONTROLLING DEVICES
Filed April 2, 1932   4 Sheets-Sheet 4
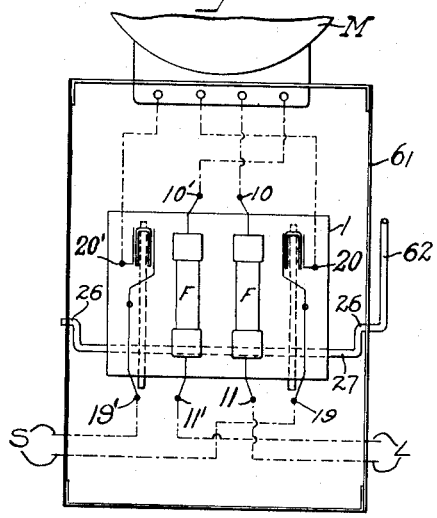
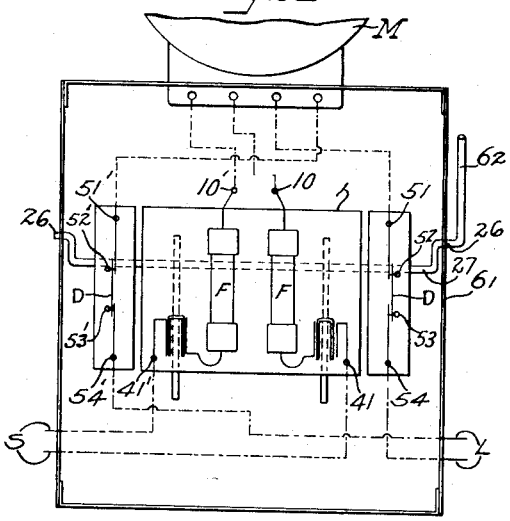
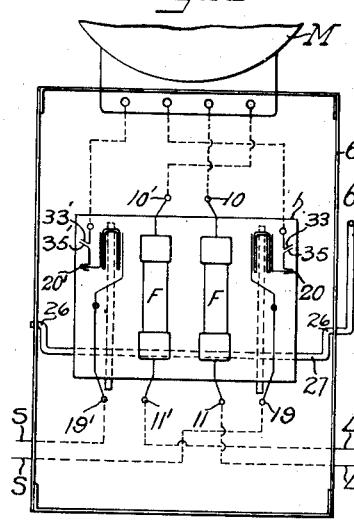
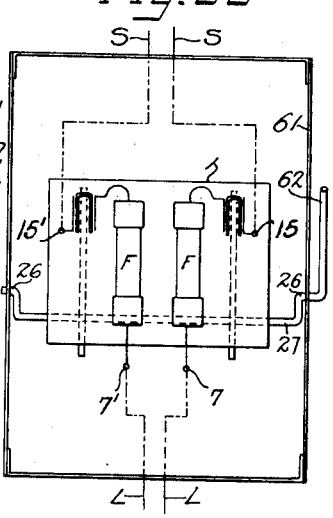
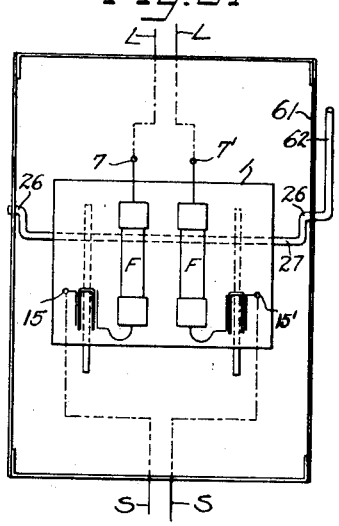
Inventor
Joseph Sachs
By S. Jay Teller
Attorney Patented Feb. 26, 1935

1,992,719

UNITED STATES PATENT OFFICE 1,992,719

SYSTEM OF CIRCUIT CONTROLLING DEVICES

Joseph Sachs, West Hartford, Conn.

Application April 2, 1932, Serial No. 602,859

8 Claims. (Cl. 200—114)

My invention relates in part to appurtenances and appliances providing for the complete control, maintenance and protection of an electric service installation including a meter. In such installations it is usual to place, at a point in proximity to where the service wires enter the building, a switch and also an automatic overload protective device such as a fuse. There is also installed at this point by the service company their electric meter for recording the energy consumed. In such electric meter service installations the necessary devices and appliances are ordinarily combined in a single complete installation arrangement providing for the turning on and off of the current by the switch, the automatic protection of the service by the fuses, the testing of the meter by means of suitable arrangements of the switch and fuse parts or by the provision of additional testing facilities, and a suitable enclosure or box by means of which the aforesaid parts and also a portion of the meter are mechanically protected so as to prevent tampering and insure safety.

One of the objects of the present invention is to provide a system of manufacture for electric switches, which system permits the manufacture of any one of several varieties of meter service appliances such as described or the manufacture of general purpose or industrial switches. In accordance with the invention I am able, by providing a single style or form of main base and a relatively small number of associated parts, to make it possible to construct any one of several different meter service switches or appliances, these including a meter service appliance having the sequence switch—meter—fuse, a meter service appliance having a sequence of fuse—meter—switch, a meter service appliance having a sequence of switch—fuse—meter—test link, or a general purpose or industrial switch having the switch and fuse directly connected in series.

A further object of the invention is to provide, in a switch of the type referred to and having a cranked operating member, an improved means for releasably holding the said operating member and the movable switch parts either in their circuit making position or their circuit breaking position.

A further object of the invention is to provide a fused switch having an improved arrangement of switch and fuse parts and wire terminals therefor, so as to enable the switch contacts to be visible and so as to also provide increased wiring convenience.

In the accompanying drawings I have shown several embodiments of the invention and it will be understood that the drawings are intended for illustrative purposes only and are not to be construed as defining or limiting the scope of the invention, the claims forming a part of this specification being relied upon for that purpose.

Of the drawings:

Fig. 1 is a front view of a meter service unit embodying the invention, this view showing only the insulating base and the parts carried thereby and omitting the enclosing box. A portion of this view is in section along the line 1—1 of Fig. 4.

Fig. 2 is a side view of the unit shown in Fig. 1, this view also showing a portion of the rear wall of the enclosing box.

Fig. 3 is a bottom view of the unit shown in Fig. 1.

Fig. 4 is a horizontal sectional view taken along the line 4—4 of Fig. 1.

Fig. 5 is a fragmentary view similar to Fig. 1, but showing an alternate embodiment of the invention.

Fig. 6 is a fragmentary view similar to Fig. 2 and showing a side elevation of the alternative construction shown in Fig. 5.

Fig. 7 is a view similar to Fig. 6, but showing the parts in different relative positions.

Figs. 8, 9 and 10 are views similar respectively to Figs. 1, 2 and 3, but showing an alternative embodiment of the invention.

Fig. 11 is a fragmentary horizontal sectional view taken along the line 11—11 of Fig. 8.

Figs. 12 and 13 are front and side views respectively of a test link unit adapted to be used in conjunction with the unit shown in Figs. 8 to 11.

Figs. 14 and 15 are views similar respectively to Figs. 8 and 9, but showing an alternate embodiment of the invention, many of the parts being the same but in reversed positions.

Fig. 16 is a diagrammatic front view showing an enclosing box of the type which may be used for any of the appliances or switches embodying the invention.

Fig. 17 is a diagrammatic front view of a complete meter service appliance including the unit shown in Figs. 1 to 4.

Fig. 18 is a view similar to Fig. 17, but including the unit shown in Figs. 5 to 7.

Fig. 19 is a diagrammatic front view of a complete meter service appliance including the unit shown in Figs. 8 to 11 and also including two of the units shown in Figs. 12 and 13.

Fig. 20 is a diagrammatic front view of a general purpose or industrial switch including the unit shown in Figs. 15 and 16.

Fig. 21 is a view similar to Fig. 19, but showing the unit reversed in position.

In Figs. 1 to 4 I have shown one of the units which may be manufactured in accordance with my novel system. All of the conducting parts of the unit are mounted upon an insulating base 1, which base is preferably so formed as to be adapted not only for use in the unit shown in Figs. 1 to 4 but also for use in other units to be hereinafter described. The base 1 is shown as adapted for the mounting thereon of the conducting parts for two legs of the circuit. Inasmuch as these parts for the two legs are similar to each other except for reversals of position I shall confine myself in the main to one set of such parts, that is, those at the right.

Mounted upon the front of the base 1 is a pair of fuse contacts 2 and 3, held in place by screws engaging the said contacts from the rear. I have shown contacts adapted to receive a cartridge enclosed fuse, but as to this I do not necessarily limit myself. Surrounding the fuse contacts is a barrier 4 and when there are two pairs of contacts as shown there is a partition 5 between them. Connected respectively with the fuse contacts 2 and 3 are wire terminals 6 and 7, these terminals being located respectively at the top and bottom of the base 1. As shown there are conducting straps 8 and 9 which extend through openings in the top and bottom of the barrier 4, these being connected at their inner ends with the respective fuse contacts and at their outer ends carrying screws 10 and 11 by means of which the said wire terminals are attached.

Mounted on the base 1 adjacent the rear thereof are switch contacts 12 and 13. These contacts are preferably spaced apart transversely and have oppositely facing substantially parallel contact faces. Electrically connected with the said contacts 12 and 13 are wire terminals 14 and 15. The two terminals 14 and 15 are preferably in vertical register with each other as shown in Fig. 1, it being understood that Fig. 1 shows the normal position of the switch when mounted upon a vertical wall. Preferably the base 1 is provided with an opening 16 extending from front to rear thereof and the switch contacts 12 and 13 are so associated with the said opening 16 as to be visible therethrough from the front. Preferably the said contacts are positioned entirely within the opening. As shown the switch contact 12 has an integral forward extension 12ª which projects through the opening 16 and a further extension 12ᵇ which lies along the front of the base and is held in place by means of a nut on a screw 17 and also by means of a screw 18. The terminal 14 is connected with the extension 12ᵇ by means of a screw 19. The contact 13 has a forward extension 13ª and a lateral extension 13ᵇ, this latter extension being engaged by a screw 20 which holds the contact in place. The same nut also holds the terminal 15.

By preference the base 1 is so constructed as to be mounted substantiallly directly upon a rear supporting wall which may be the rear wall 22 of an enclosing cabinet, as shown for instance in Fig. 2. The base is held in place by means of screws in the holes 21, 21. If desired a sheet 22ª of insulating material may be interposed between the base and the rear wall.

A movable switch element is provided for making and breaking electrical connection between the stationary switch contacts 12 and 13, this element moving substantially parallelly with the rear of the base; and preferably there is a rectilinearly movable switching member of which the said switch element is a part. When the base is constructed for being mounted as described, it is preferably provided with a slot 23 which extends vertically and which intersects the beforementioned opening 16. Longitudinally movable in the slot 23 is an insulating element 24 in the form of a flat plate which is guided at the front by the front wall of the slot 23 and which is guided at the rear by the rear supporting wall to which the block 1 is attached. Carried by the insulating element 24 is a conducting element 25 which has parallel contact faces at opposite sides of the insulating element, which faces are so spaced as to be adapted to engage respectively with the contact faces of the contacts 12 and 13. The element 25 is preferably in the form of a substantially closed loop as shown in section in the left hand portion of Fig. 1.

When the switching member comprising the elements 24 and 25 is in the position shown in Figs. 1 and 2, electrical connection is established between the two switch contacts; but when the switching member is moved upward from the said position electrical connection is broken. Preferably the switching member 24—25 is operated by means of a pivoted member 26 having a crank portion 27 extending through a transverse slot 28 in the said insulating element 24. A recess is formed in the lower rear portion of the base to permit the cranked portion of the operating member to move. The pivoted member 26 is preferably mounted independently of the block 1, as for instance in the side walls of the enclosing box as clearly shown in Figs. 16 and 17.

In order that the operating member 26 may be releasably held either in its circuit making position or in its circuit breaking position I provide a spring retaining member 29 which is preferably clamped between the body of the block 1 and the rear supporting wall. As shown the block 1 is provided at the rear with a groove of sufficient depth to receive the upper end portion of the spring 29 and is further provided with a notch 30 into which projects an angularly bent portion of the spring. It will be observed that when the block is secured in place with respect to the supporting wall the spring 29 is so held that it cannot be displaced. The spring 29 engages the crank portion 27 of the operating member and serves to releasably hold it either in the circuit making position shown by full lines in Fig. 2 or in the circuit breaking position shown by dot-and-dash lines in Fig. 2.

Preferably the unit shown in Figs. 1 to 4 is provided with devices for holding rigid by-pass links adapted for use during meter testing. As shown the screws 11 and 19 are so spaced as to be adapted to engage a by-pass link A of standard form, the said link being adapted to be clamped in place by means of additional nuts on the said screws as clearly shown in Fig. 3. Similarly the two screws 17 and 20 are so spaced as to be adapted to engage a by-pass link B, which link is preferably of exactly the same size and type as the link A. The link B is held in place by additional nuts on the screws 17 and 20 as clearly shown in Fig. 2. Preferably the connecting strap 8 and the corresponding strap 8' at the left are so formed as to position the screw 10 and the corresponding screw 10' at the left in such spaced relation that the said screws are adapted to engage a by-pass link C which is preferably of the same type and size as the aforesaid links A and B.

Figs. 5, 6 and 7 are fragmentary views of a unit similar to that shown in Figs. 1 to 4 with the single exception that a manually operable circuit interrupting means is interposed in the circuit between the upper switch contact and the corresponding wire terminal. The terminal 15 instead of being held by a nut on the screw 20 is held by a nut on a screw 31 which extends through a hole 32 in the upper corner portion of the base. Also held by the same nut is a conducting member 33 having an angularly disposed contact portion 33ª. Mounted on the screw 20 is a nut 34 and associated with the nut is a conducting element 35 having an angularly disposed contact portion 35ª adapted to engage the contact portion 33ª of the conducting element 33. Preferably the nut 34 is provided with a flange extension 34ª which extends through the conducting element 35 and serves to rotatably connect the nut with the said element. Normally the parts are in the position shown by full lines in Fig. 6, the wire terminal 15 being electrically connected with the switch contact 13 by means of the two conducting elements 35 and 33. When it is desired to break the circuit between the switch contact 13 and the terminal 15 the nut 34 is rotated to raise the element 35 to the position shown by dot-and-dash lines in Fig. 6. The said element 35 can then be reversed in position as shown in Fig. 7, thus providing a break in the circuit between the two elements 35 and 33.

In Figs. 8 to 11 I have shown a somewhat different unit which nevertheless comprises a base 1 which may be identical in construction with the base 1 already described. The base 1 while the same as that shown in Figs. 1 to 4 is preferably reversed in position.

Fuse contacts 2 and 3 are provided similar to those already described and the contact 2 is connected with a conducting strap 8 and a wire terminal 6 as already described.

Switch contacts 36 and 37 are provided which correspond respectively with the before-mentioned contacts 12 and 13. The contact 36 is provided with a lateral extension 36ª which engages a forward extending conductor 38 having an angularly bent front portion 38ª which engages with the fuse contact 3. The same screw 39 which holds the fuse contact 3 in place extends through the contact extension 36ª and through the conductor 38 thus serving to hold the elements in place and in engagement with each other. The switch contact 37 is provided with a lateral extension 37ª. The extension 37ª is engaged by a screw 40 having the same location on the block as the screw 20, and it is further engaged by a screw 41 having the same location on the block as the screw 31 shown in Figs. 5 to 7. A nut on the screw 41 holds a wire terminal 42.

There is provided a switching member 43—44 which is similar to the switch member 24—25, with the exception that the conducting element 44 is differently located with respect to the insulating element 43. The operation of the switching member is the same as before described and repetition is unnecessary.

In Figs. 12 and 13 I have shown a test link unit which comprises an insulating base 46 adapted to be secured to a rear supporting wall, as for instance the rear wall of the enclosing cabinet.

The base is adapted to be held in place by two screws, one extending through the hole 47 and the other extending through the notch 48. The base 46 is recessed at the upper rear portion, the recess being similar to the before-mentioned recess in the base 1. Mounted on the front of the base 46 are conducting straps 49 and 50, the strap 49 being held in place by nuts on screws 51 and 52 and the strap 50 being held in place by nuts on screws 53 and 54. The said screws 51 and 54 also serve to hold wire terminals 55 and 56. The two screws 52 and 53 are so spaced as to be adapted to engage a test link D which is preferably of the same type and size as the links A, B and C already described. The link D is held in place by nuts on the said screws 52 and 53.

In Figs. 14 and 15 I have shown a unit which is in many respects similar to the unit shown in Figs. 8 to 11, but which differs therefrom in certain respects. The base 1 is shown in a position reversed with respect to that shown in Figs. 8 to 11, being in the same position as shown in Figs. 1 to 7. Connected with the fuse contact 3 is a conducting strap 9 carrying a wire terminal 7, these parts being the same as or similar to those shown in Figs. 1 to 3. The switch contact 36 is or may be the same as the contact 36 shown in Figs. 8 to 11, and it is similarly connected with the fuse contact 2. The switch contact 13 is or may be the same as the contact 13 shown in Figs. 1 to 4, and it is held by a screw 59 which is somewhat shorter than the screw 20. This screw 59 also holds the wire terminal 15. With the unit shown in Figs. 14 and 15 there is provided a switching member 24—25 which may be identical in construction with the switching member shown in Figs. 1 to 4. The switching member is shown in the upper open-circuit position.

In Fig. 16 I have shown on a reduced scale a box of the type which may be used with any of the assemblies hereinafter described. The box as an entirety is represented at 61 and the before-mentioned operating member 26 is pivotally mounted in the side walls of the box. The said member includes a handle 62 which projects at one side of the box and is manually operable. The box is provided with an openable front cover 63.

When it is desired to obtain access to the fuses without opening the main cover the said main cover is provided with a fuse opening 64. I have described the insulating base 1 as comprising a barrier 4 surrounding the fuse contacts and the dimensions of the box are such that when the main box cover is closed the front of the barrier substantially contacts with the said cover adjacent the edges of the opening 64. It will be apparent that with the cover 63 closed the fuses can be put in place in the contacts 2 or 3 or removed therefrom through the said opening 64, but that access cannot be had to switch parts or other conducting parts within the box.

Preferably there is provided a supplemental cover 65 for the opening 64. This cover may if desired be interlocked with the switch handle 62. In Fig. 16 I have shown an interlocking construction of the type disclosed in my Patent No. 1,843,957 dated February 9, 1932. The cover 65 is vertically slidable and in Fig. 16 it is shown in its lower or open position. Connected with the cover 65 is a slide 66 which is shown as projecting laterally from the position so as to obstruct the movement of the handle 62, thus holding it in its lower or open-circuit position. With the parts in the position shown the fuses can be put in place or locked, but the switch is locked in its open position. When the cover 65 is raised to close the opening 64 it can then be moved transversely toward the left carrying the slide 66 with it. This transverse movement locks the cover in closed position, and it frees the handle 62 so that it can be moved upward to close the switch. In moving to its switch closing position the handle obstructs the slide 66 and thus serves to hold the cover 65 in its closed and locked position.

In Figs. 17 to 21 I have shown diagrammatically some of the complete switches or appliances which can be constructed by assembling one or more of the before described units with suitable enclosing boxes. These several constructions will now be separately described.

Referring first to Fig. 17 it will be apparent that the appliance shown in this figure includes a unit such as shown in detail in Figs. 1 to 4. There is provided an enclosing box 61 which may be the same as that shown in Fig. 16. The box 61 preferably includes at its upper end an end wall adapted for direct cooperation with the meter terminal portion of an electric meter M.

Service wires S are connected to the wire terminals held by the screws 19, 19'. Connected with the wire terminals held by the screws 20, 20' are wires leading to the meter M and connected with the wire terminals held by the screws 10, 10' are wires leading from the said meter. Load wires are connected with the wire terminals held by the screws 11, 11'. It will be apparent that when the appliance is connected as described there is provided a sequence of switch—meter—fuse. The switch being ahead of the meter makes it possible for the meter to be completely disconnected from the service wires at any time by merely opening the switch in the regular way; and the location of the fuses after the meter makes it impossible for theft of current to be effected by making connections to the contacts or parts. In Fig. 16 I have shown an interlocked supplemental cover for the fuses, but it will be apparent that this serves primarily as a safety device to prevent shock or injury to the user and that even without the interlocked cover any theft of current would be impossible, provided that the main cover 63 is sealed or locked in closed position.

The appliance shown in Fig. 17 is so constructed as to facilitate meter testing. In connection with Figs. 1 to 4 I have described in detail the devices for the attachment of by-pass links. It will be apparent that by putting links A in place between the screws 19, 11 and 19', 11' by-pass connections are established directly from the service wires S to the load wires L, thus enabling the customer's service to be maintained during meter testing. This service-to-load by-pass is at the bottom of the device, which location is ordinarily the most convenient for the meter tester.

If it is desired to disconnect the load side of the meter from the load wires this can be done by removing the fuses F, F from their contacts. If it is desired to connect the service side of the meter from the service wires this can be done by simply opening the switch in the usual way. If it is desired to disconnect only one coil of the meter from its service wire without disconnecting the other this can be done by first putting in place a link B at the side which is to remain connected and then opening the switch in the usual way. If it is desired to connect the two coils of the meter in series this can be done by putting in place a link C to connect the terminals held by the screws 10, 10'.

It will be understood that the several nuts on the aforesaid link holding screws are also adapted to serve as test contacts for the attachment of flexible leads extending to a test meter or other meter testing instrumentality. The said screws are longer than would otherwise be necessary and the projecting forward ends of these screws can be used, if preferred, for holding the clamps that are commonly provided on the flexible leads of testing apparatus.

While I have shown in Fig. 17 a sequence of switch—meter—fuse, it will be obvious that by reversing the positions of the several wires there may be provided a sequence of fuse—meter—switch.

In Fig. 18 I have shown an appliance similar to that shown in Fig. 17, but including supplemental circuit interrupting means as shown in detail in Figs. 5 to 7. The connections for this device and the manner of use are, in the main, the same as already described in connection with Fig. 17. It will be observed, however, that this device includes no provision for establishing a by-pass across the switch contacts, but in lieu thereof provides the before-mentioned circuit interrupting devices. Under some circumstances the by-passing of one of the switches as described in connection with Fig. 17 is deemed objectionable because of the possibility that the meter tester may inadvertently leave the by-pass link in place, thus rendering the corresponding switch ineffective. To avoid this possibility the described supplemental interrupting means are provided, and it will be obvious that either coil of the meter may be disconnected from the corresponding service wire by operating the corresponding interrupting means in the manner already described in connection with Figs. 5 to 7. It will be understood that when one of the circuit interrupting means is to be used the main switch remains in its normal closed position.

In Fig. 19 I have shown an appliance which includes the unit shown in detail in Figs. 8 to 11 and which also includes two of the units shown in detail in Figs. 12 and 13. The main unit is placed at the center of the enclosing box and the two test link units are placed at the sides. The enclosing box is or may be similar to that already described except that it is wider.

The two service wires S are connected respectively with the terminals held by the screws 41, 41'. The terminals held by the screws 10, 10' are connected with wires leading to the meter M and the wires leading from the meter are connected respectively with the terminals held by the screws 51, 51'. The load wires L are connected with the terminals held by the screws 54, 54'. It will be seen that this appliance provides a sequence of switch—fuse—meter—test link. The relationship between the units is such that by-pass links A can be put in place on the screws 41, 54 and 41', 54' to connect the service wires S directly with the load wires L. It will be apparent that the load side of the meter may be disconnected from the load wires by removing the test links D, and it will further be apparent that the service side of the meter may be disconnected from the service wires either by opening the switch or by removing the fuses. The meter coils may be connected in series in the manner already described by connecting the screws 10, 10' by means of a test link C.

In Fig. 20 I have shown a general purpose industrial switch which includes the unit shown in detail in Figs. 14 and 15. The service wires S are connected respectively with the terminals 15, 15' and the load wires L are connected respectively with the terminals 7, 7'. The enclosing box may be the same as that already described except that it does not have a top end wall adapted for association with a meter.

In Fig. 21 I have shown a switch very similar to that shown in Fig. 20, but differing in that the main unit is in reversed position. This reversal of position makes it necessary to provide a switching member 43—44 such as shown in detail in Figs. 8 to 11 and as shown diagrammatically in Fig. 19. It will be apparent that with the switch shown in Fig. 20 the service wires S can conveniently enter the box at the upper portion thereof and the load wires L can leave the box at the lower portion thereof. When it is desired to reverse this arrangement of service and load wires it is preferable to use the reversed arrangement of parts shown in Fig. 21.

What I claim is:

1. For a fused electric switch, an insulating base having provision at the front for the mounting thereon of a pair of fuse contacts one of which is connected with a wire terminal, having provision for the mounting thereon of a pair of switch contacts one of which is connected with a wire terminal, and further having provision for the interchangeable mounting thereon either of an electrical conductor directly connecting the said remaining switch and fuse contacts or of two conductors carrying additional wire terminals and connected respectively with the remaining fuse and switch contacts, the said base serving to hold in close proximity to each other two of the aforesaid wire terminals connected respectively to a fuse contact and to a switch contact.

2. In a system of manufacture for fused electric switches, the combination of an insulating base, a fuse contact connected with a wire terminal and mounted on the base at the front thereof, a switch contact mounted on the base adjacent the rear thereof and connected with a wire terminal at the front, two interchangeably mountable sets of conducting elements, one of the said sets comprising a fuse contact and a switch contact directly connected with each other and adapted to be mounted on the base with the said contacts in complemental relationship respectively with the first said fuse and switch contacts, and the other of the said sets comprising fuse and switch contacts having wire terminals respectively connected therewith which contacts are adapted to be mounted on the base in complemental relationship respectively with the first said fuse and switch contacts and with the said switch connected terminal at one side of and closely adjacent one of the said fuse connected terminals, and a switching member movable to make and break electrical connection between the said switch contacts.

3. In a system of manufacture for fused electric switches, the combination of a bodily reversible insulating base, a pair of fuse contacts mounted on the base at the front thereof, a pair of transversely spaced switch contacts mounted on the base adjacent the rear thereof, and two structurally different interchangeably usable switching members each comprising a flat insulating plate rectilinearly movable at the rear of the base and also comprising a conducting element carried by the insulating element and movable between the switch contacts to electrically connect them, one of the said switching members being adapted to be used when the base is in one position and the other being adapted to be used when the base is in the other position.

4. In an electric switch, the combination of an insulating base normally held in a fixed position adjacent a rear supporting wall, two stationary switch contacts on the base, a movable switching member associated with the base and including an insulating element and also including a conducting element adapted to make and break electrical connection between the stationary contacts, a separately supported pivoted member having a cranked portion engaging the insulating element for moving the said switching member in either direction to make or break the circuit, and a retaining spring adapted to be clamped between the insulating base and the supporting wall and having a portion adapted to engage the cranked portion of the pivoted member to releasably hold the said member and also the switching member either in their circuit making positions or in their circuit breaking positions.

5. In a fused electric switch, the combination of an insulating base having an opening therein from front to rear, a pair of fuse contacts mounted on the front of the base at one side of the said opening, a pair of transversely spaced switch contacts mounted on the base adjacent the rear thereof and in association with the said opening so as to be visible therethrough, and a switching member at the rear of the base comprising a conducting element movable substantially parallelly with the rear of the base and between the switch contacts to electrically connect them.

6. In a fused electric switch, the combination of an insulating base having an opening therein from front to rear, a pair of fuse contacts mounted on the front of the base at one side of the said opening, a pair of transversely spaced switch contacts mounted on the base adjacent the rear thereof and in association with the said opening so as to be visible therethrough, two wire terminals adjacent the front of the base and connected respectively with one fuse contact and one switch contact, the connection between the said switch contact and its terminal extending through the said opening in the base, and a switching member at the rear of the base comprising a conducting element movable substantially parallelly with the rear of the base and between the switch contacts to electrically connect them.

7. In a fused electric switch, the combination of an insulating base, a pair of fuse contacts mounted on the front of the base, a pair of transversely spaced switch contacts mounted on the base adjacent the rear thereof, a switching member at the rear of the base comprising a conducting element movable between the switch contacts to electrically connect them, a pair of wire terminals at the front of the base respectively adjacent the top and bottom thereof and connected respectively with the fuse contacts, and a second pair of wire terminals adjacent the front of the base and connected respectively with the switch contacts, one of the last said terminals being above the other and both of them being transversely spaced from the said fuse contacts and terminals.

8. In a fused electric switch, the combination of an insulating base having an opening therein from front to rear, a pair of fuse contacts mounted on the front of the base at one side of the said opening, a pair of transversely spaced switch contacts mounted on the base adjacent the rear thereof and in association with the said opening so as to be visible therethrough, a switching member at the rear of the base comprising a conducting element movable parallelly with the rear of the base and between the switch contacts to electrically connect them, a pair of wire terminals at the front of the base respectively adjacent the top and bottom thereof and connected respectively with the fuse contacts, and a second pair of wire terminals adjacent the front of the base and connected respectively with the switch contacts through the said opening in the base, one of the last said terminals being above the other and both of them being transversely spaced from the said fuse contacts and terminals.

JOSEPH SACHS.